INVENTORS
WILBUR F. JACKSON &
THEODORE J. DYKZEUL

BY Anthony A. O'Brien

ATTORNEY

United States Patent Office 3,374,951
Patented Mar. 26, 1968

3,374,951
DUAL THERMOSTATIC CONTROL DEVICE
Wilbur F. Jackson and Theodore J. Dykzeul, Rolling Hills, Calif., assignors to Robertshaw Controls Company, Richmond, Va., a corporation of Delaware
Filed Apr. 28, 1966, Ser. No. 545,958
7 Claims. (Cl. 236—21)

This invention relates to a thermostatic control device and, in particular, to such a control device embodying a high limit cutoff feature.

In modern heating appliances, such as domestic hot water heaters, it is standard practice to control a supply of fuel to a main burner and to a pilot burner, with the main burner flow being thermostatically controlled within a normal operating range and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube thermostat.

With the above arrangement, failure of the thermostatic valve means for any reason could result in tank explosions from dangerously high temperatures in the hot water tank. Accordingly, it is desirable to provide the control system with a high limit cut off feature responding to abnormal temperature conditions in the water tank. The high limit cutoff feature is associated with the thermoelectric safety device, which thus requires reset in response to two separate conditions, one being the extinguishment of the flame at the pilot burner and the other being the occurrence of an abnormal temperature condition.

An object of the present invention is to provide a thermostatic control device with a second temperature sensing means in a unitary housing.

The present invention has another object in that the closed end of a tube in a rod and tube thermostat is arranged to house a thermostatic switch assembly so as to directly sense the temperature variations.

A further object of the present invention is to enclose a stack of bimetal discs in a thermostat housing to actuate a control device in response to temperature variations sensed by the housing.

In accordance with the present invention, a thermostatic control device includes a casing having inlet and outlet means and a flow passage therebetween, control means in the flow passage, normal temperature sensor means carried by the casing having rod and tube elements of different thermally responsive materials, an operative connection between the rod and the control means for moving the same between controlling positions, thermoelectric means including safety shut-off means in the passage and electromagnetic means for holding the safety shut-off means in an open position, thermoelectric circuit means for energizing the electromagnetic means, bimetal switch means in the tube electrically connected in the circuit means for deenergizing the electromagnetic means in response to abnormal temperature conditions, and bimetal disc means in the tube engaging the rod for effecting movement thereof in response to normal temperature conditions.

Other objects and advantages of the present invention will become apparent from the following description of a preferred embodiment taken in connection with the accompanying drawing wherein.

While the present invention may be applicable to various types of control devices and various types of heating appliances and may be utilized in connection with electrical heating elements as well as gaseous fuel burning heater elements, it will be described in connection with a fuel burner control system for a hot water heater.

Figure 1:
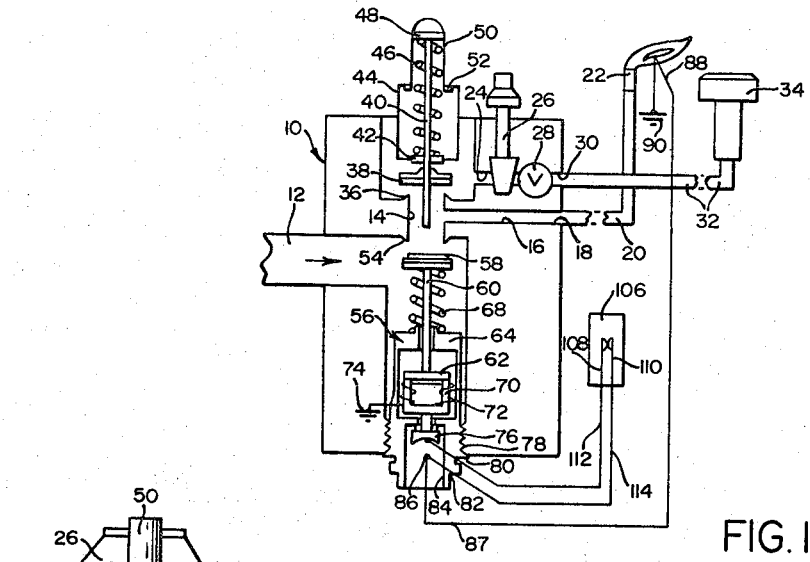
FIG. 1 is a schematic diagram of a fuel burner control system embodying the present invention.

As is illustrated in FIG. 1, the present invention is embodied in a control device including a casing, indicated generally at 10, having an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 that is controlled by a manually operable on-off valve 26 and a thermostatically operated valve 28, which valves are upstream of a main flow outlet port 30 that communicates with a conduit 32 for supplying fuel to a main burner 34.

The pilot flow passage 16 communicates with the common passage 14 intermediate its opposite ends which define upstream and downstream valve seats. The downstream valve seat 36 is controlled by combined reset and valve means which includes a valve member 38 carried adjacent one end of a reset stem 40. The upper end of the stem 40 extends through a sealing collar 42 on a plunger housing 44 in which a coil spring 46 encircles the stem 40 and is mounted in compression between the collar 42 and a disc 48 on the end of the stem 40. The stem 40 is retained in the housing 44 by means of a hollow push button 50 which receives the stem disc 48 and which includes an annular bottom flange 52 engaging the housing wall surrounding an opening therefor.

The upstream valve seat 54 is controlled by an electromagnetic device, indicated generally at 56, having a safety shutoff valve member 58 movably disposed for cooperation with the valve seat 54. The valve member 58 is fixed to one end of an armature stem 60 which has its other end fixed to an armature 62 located in a fixed magnet housing 64 so that the stem 60 is slidably disposed relative to the housing 64. A coil spring 68 surrounds one end of the armature stem 60 and is mounted in compression between the top end wall of the magnet housing 64 and the rear surface of the valve member 58 which is thus biased to a closed position against the valve seat 54. The valve member 58, stem 60 and armature 62 reciprocate as a unit between released and attracted positions relative to fixed electromagnetic means in the form of a generally U-shaped magnet core 70 and an electric coil 72 wound thereon. One end of electric coil 72 is connected to a ground terminal 74 and the other end is connected to an electrical conductor 76.

As is shown in FIG. 1, the bottom end wall of the magnet housing 64 is defined by support means in the form of a magnet base 78 having external threads so that the entire assembly 56 may be threaded into a suitable opening in the casing 10. In order to prevent any fuel leakage from such opening, the threads are provided with a sealing compound and a tapered sealing lip 80 on the periphery of the magnet base 78 which has a seal tight relationship with the periphery of such opening.

The conductor 76 extends through the top portion of the base 78 and has a concave surface disposed in the upper part of a cavity formed in the bottom portion of the base 78. A hexagonal periphery 82 on the exterior of the base bottom portion receives a wrench or tool for tightening the assembly 56 in the threaded opening of the casing 10. The bottom of base 78 has a threaded opening 84 which receives a thermocouple cable connector (not shown) having a conductor 86; a thermocouple lead 87 from one side of a thermocouple 88 extends to such conductor 86 while the other side of the thermocouple 88 is connected to a ground terminal 90. The thermocouple 88 is mounted in the proximity of the pilot burner 22 so as to be heated from the flame thereof.

Figure 2:
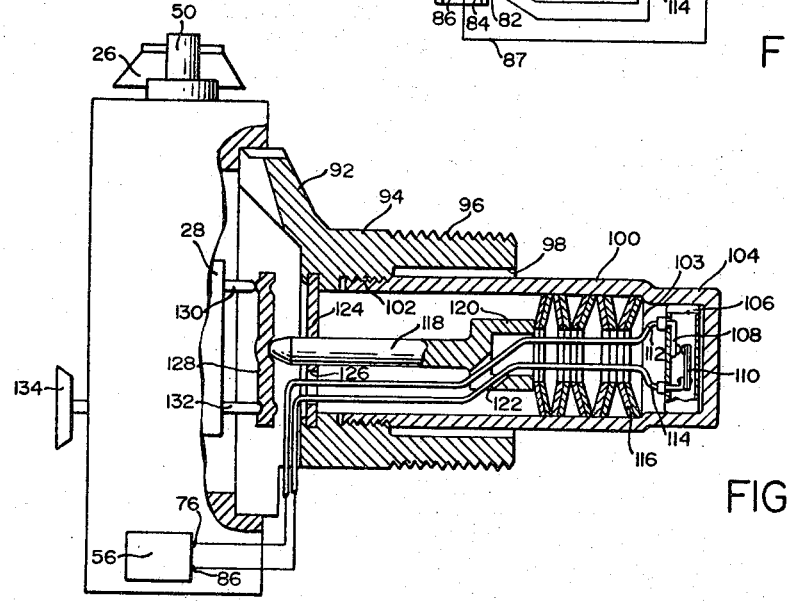
FIG. 2 is a schematic diagram of the control device of FIG. 1 with parts broken away and parts in section.

As is illustrated in FIG. 2, the thermostatic means for the control device is carried by the casing 10 and a flanged portion 92 of a mounting shank 94 is attached to the rear wall of casing 10 as by cap screws (not shown). The free end of mounting shank 94 includes external threads 96 for threading the assembly through the wall of a hot water tank (not shown) and a stepped internal recess 98 that is coextensive with the tube 100 of a thermostatic unit; with such an arrangement, substantially the entire length of the tube 100 is disposed in the hot water resulting in a more accurate and faster response of the thermostatic unit. The inner end of shank recess 98 is threaded to receive the threaded end 102 of the tube 100 which is made of thermally responsive material, such as drawn copper. Adjacent its free end, the tube 100 is reduced in cross-section defining an internal annular shoulder 103 and terminating in a cup-shaped recess 104 which provides a mounting for a bimetal switch, indicated generally at 106.

The bimetal switch 106 includes a sealed casing that conforms to configuration of the walls of recess 104 so as to be in surface contact therewith for good thermal conductivity therebetween. The bimetal switch 106 includes a fixed contact arm 108 and a bimetallic contact arm 110 disposed for switching cooperation; contact arms 108 and 110 have sealed-in terminals for connection to lead wires 112 and 114, respectively. The other ends of lead wires 112 and 114 extend through a suitable side opening in the magnet housing base 78 and are connected to conductors 76 and 86, respectively. Thus, the conductor 86 defines a common junction whereby the bimetal switch 106 is electrically connected in series with the thermocouple lead 87 of the thermoelectric circuit. The switch 106 is calibrated to respond to a predetermined abnormal temperature condition and thus defines a limit switch operable at a higher temperature than that of the normal temperature responsive thermostatic valve 28.

Figure 3:
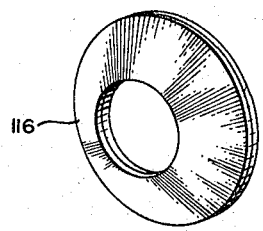
FIG. 3 is a perspective view of a detail of FIG. 2.

An actuating mechanism for the thermostatic valve 28 includes a plurality of bimetal annular discs 116, each of which has a dished configuration as shown in FIG. 3. The plurality of bimetal discs 116 are stacked in opposition to each other to define an accordion assembly that expands and contracts with temperature variations. As is illustrated in FIG. 2, the right end disc 116 has its outer peripheral portion abutting the annular shoulder 103 and each succeeding disc is alternately dished so that the left end disc 116 has its inner peripheral portion engaging an actuator rod 118. To effect such engagement, the rod 118 has a cup-shaped end 120, the lip of which abuts the adjacent disc 116 at its inner periphery. The rod cup 120 has an opening 122 whereby the lead wires 112 and 114 may extend through the central holes of the annular discs 116 and thence through the opening 122 so as not to impede axial movement of the rod 118 and/or the discs 116. The other end of rod 118 extends through a closure plate 124 for the tube end of the shank recess 98 and an opening 126 permits threading of the lead wires 112 and 114 therethrough for connection to the thermoelectric circuit as described above.

On its end opposite the cup 120, the rod 118 has a rounded end engaging an intermediate recess in an operating lever 128. A projection on one end of lever 128 engages the actuating rod 130 of the thermostatically operated valve 28; an indentation on the other end of lever 128 receives the end of an adjusting shaft 132 which is axially movable by means of a temperature setting dial 134. With such an arrangement, it is now apparent that rotation of the dial 134 through a selective range of temperature settings will change the relative position of the operating lever 128 whereby the tempertaure at which the valve 28 is actuated, will be determined by the adjusted position of the lever 128.

The rod 118 is made of thermally non-responsive material and with the tube 100 defines a rod and tube type thermostat unit. Because of the stacked bimetal discs 116, the rate of response of the thermostat unit is greater than the rate of response for a conventional rod and tube thermostat unit. The rate of response is increased because the tube 100 as well as the bimetal discs 116 will expand and contract in response to temperature variations.

The particular sequence of operation of the above circuitry will be described in detail in connection with the following description of the overall operation of the control device. To place the system of FIG. 1 in operation, the manual valve 26 is rotated to an on position and temperature setting dial 134 for the thermostatically operated valve is moved to a selected temperature, e.g., 140° F. for conventional domestic hot water heaters. The reset button 50 is manually depressed whereby the valve member 38 is closed on valve seat 36 to prevent any fuel flow through the main flow passage 24 during lighting and whereby the lower end of the reset stem 40 moves the valve member 58, stem 60 and armature 62 as a unit against the bias of coil spring 68 to an attracted or valve open position permitting a fuel flow through the pilot flow passage 16 to the pilot burner 22 where it is ignited as by a match. As soon as the thermocouple 88 is heated sufficiently by the pilot burner flame to energize the holding electromagnetic means, core 70 and coil 72, the pushbutton may be released whereupon the armature 62 is held in its attracted position and both valve seats 36 and 54 are open. Inasmuch as the thermostatically operated valve 28 is open, fuel flows to the main burner 34 which is ignited by the flame of the pilot burner 22.

When the water temperature reaches the selected temperature, the valve 28 is closed and the main fuel flow is cut off and the main burner 34 is extinguished. A subsequent decrease in the water temperature, as when the hot water is drawn off and replenished with cold water, causes the valve 28 to be opened again. During normal operation the main burner 34 will be cycled thermostatically as outlined above to maintain the water temperature at 140° F.

Should the flame at the pilot burner 22 be extinguished from any cause, the thermocouple 88 will cool and the thermoelectric current to the magnet coil 72 will cease; thereupon the armature 62 will be released from the magnet core 46 under the bias of the coil spring 68, which closes the valve member 58 on the valve seat 54 to effect 100% shutoff of all fuel flow. In order to place the system in operation again, the resetting procedure outlined above must be repeated.

In accordance with the present invention, the thermostatic device is integrally provided with a separate thermally responsive switch 106 to prevent excessively high water temperature, e.g. in range of 190° F. due to some malfunction which keeps the main burner 34 in operation. At 190° F., the high limit switch 106 is opened and the thermoelectric circuit is broken whereby the magnet coil 72 is deenergized and the armature 62 is released to effect 100% shutoff of fuel flow as described above. As soon as the temperature decreases to its normal operating range, the bimetal arm 110 closes the high limit switch 106, however, to commence operation of the system, the resetting procedure must be repeated as outlined above.

Inasmuch as the present invention is subject to many other modifications, variations and changes in detail, it is intended that all matter contained in the foregoing description or shown in the accompanying drawing shall be interpreted as illustrative and not in a limiting sense.

What is claimed is:

1. In a thermostatic control device, the combination comprising,
   a casing having inlet and outlet means and flow passage means therebetween,
   control means in said passage means movable between controlling positions,
   normal temperature sensor means carried by said casing including a tube of thermally responsive material and a rod of relatively thermally non-responsive material axially disposed in said tube,
   means defining an operative connection between said rod and said control means for moving the same between controlling positions in response to normal temperature conditions,
   thermoelectric means including safety shut-off means in said passage means and electromagnetic means adapted to be energized for holding said safety shut-off means in an open position,
   thermoelectric circuit means for energizing said electromagnetic means,
   bimetal switch means in said tube electrically connected in said circuit means for deenergizing said electromagnetic means in response to abnormal temperature conditions, and
   bimetal disc means in said tube engaging said rod for effecting movement thereof in response to normal temperature conditions.

2. The combination as recited in claim 1 wherein said tube has a reduced cross-section on its free end defining a mounting recess for said bimetal switch means to facilitate sensing of the temperature conditions by said bimetal switch means.

3. The combination as recited in claim 2 wherein an annular shoulder defines the connection between said tube and its reduced end, and wherein said bimetal disc means abuts said annular shoulder.

4. The combination as recited in claim 3 wherein said rod has an enlarged abutment on its end opposite said control means, and said bimetal disc means is mounted between said annular shoulder and said abutment.

5. The combination as recited in claim 4 wherein said bimetal disc means comprises a plurality of annular bimetal discs assembled in an accordion series to expand and contract in response to temperature variations.

6. The combination as recited in claim 5 wherein said abutment has a cup-shaped cross-section having an annular lip engaging the inner peripheral portion of the adjacent annular bimetal disc.

7. The combination as recited in claim 6 wherein said abutment has opening means through a portion of its cup-shaped cross-section, and wherein lead wires for said bimetal switch means extend through said opening means and centrally through said annular bimetal discs.

References Cited

UNITED STATES PATENTS 3,189,277 6/1965 Fox _____ 236—101
3,291,390 12/1966 Solomon _____ 236—21

EDWARD J. MICHAEL, *Primary Examiner.*